US011204087B2

(12) United States Patent
Garabello et al.

(10) Patent No.: US 11,204,087 B2
(45) Date of Patent: Dec. 21, 2021

(54) MAGNETIC TORQUE METERING SYSTEM

(71) Applicant: GE Avio S.r.l., Rivalta di Torino (IT)

(72) Inventors: Marco Garabello, Turin (IT); Simone Castellani, Viareggio (IT)

(73) Assignee: GE AVIO S.R.L., Rivalta di Torino (IT)

( * ) Notice: Subject to any disclaimer, the term of this patent is extended or adjusted under 35 U.S.C. 154(b) by 209 days.

(21) Appl. No.: 16/482,011

(22) PCT Filed: Jan. 26, 2018

(86) PCT No.: PCT/EP2018/052007
§ 371 (c)(1),
(2) Date: Jul. 30, 2019

(87) PCT Pub. No.: WO2018/138291
PCT Pub. Date: Aug. 2, 2018

(65) Prior Publication Data
US 2020/0003290 A1 Jan. 2, 2020

(30) Foreign Application Priority Data
Jan. 30, 2017 (EP) .................................... 17425006

(51) Int. Cl.
*F16H 55/17* (2006.01)
*F16H 55/06* (2006.01)
(Continued)

(52) U.S. Cl.
CPC ............. *F16H 55/06* (2013.01); *F02C 3/107* (2013.01); *G01L 3/10* (2013.01)

(58) Field of Classification Search
CPC ............ G01L 3/104; G01L 3/10; F16H 55/06
(Continued)

(56) References Cited

U.S. PATENT DOCUMENTS 3,190,113 A    6/1965   Richmond
5,490,431 A    2/1996   O'Mahony et al.
(Continued)

FOREIGN PATENT DOCUMENTS

CN      102400948 A     4/2012
DE      19817886        10/1999
(Continued)

OTHER PUBLICATIONS

PCT International Search Report PCT/EP2018/052004 dated Mar. 5, 2018.

*Primary Examiner* — Jake Cook
(74) *Attorney, Agent, or Firm* — Venable LLP; Elizabeth C. G. Gitlin; Michele V. Frank

(57) ABSTRACT

The present disclosure is directed to a shaft assembly (95) for a turbine engine (10), the shaft assembly (95) defining an axial direction and a radial direction, wherein the turbine engine (10) includes a fan or propeller assembly (14) and an engine core (20) and further wherein the fan or propeller assembly (14) includes a gearbox (45). The shaft (assembly 95) includes a coupling shaft (100) defining a plurality of coupling shaft teeth (105) extended in the axial direction, wherein each coupling shaft tooth (105) is in circumferential arrangement along the coupling shaft (100). The coupling shaft (100) includes a first material (103) and the plurality of coupling shaft teeth (105) include a second material (104) different from the first material (103).

14 Claims, 3 Drawing Sheets

(51) Int. Cl.
*F02C 3/107* (2006.01)
*G01L 3/10* (2006.01)

(58) Field of Classification Search
USPC ....................................................... 74/DIG. 4
See application file for complete search history.

(56) References Cited

U.S. PATENT DOCUMENTS

| | | |
|---|---|---|
| 6,782,766 B2 | 8/2004 | Parkinson |
| 7,398,701 B2 | 7/2008 | Zielinski |
| 8,549,931 B2 | 10/2013 | Bodin |
| 8,910,532 B2 | 12/2014 | Klimenko et al. |
| 2005/0028628 A1* | 2/2005 | Liue ................. H02K 49/102 |
| | | 74/431 |
| 2013/0160568 A1 | 6/2013 | Voss et al. |
| 2013/0312539 A1* | 11/2013 | Shimomura ............ G01L 3/104 |
| | | 73/862.325 |
| 2014/0007701 A1* | 1/2014 | Maehara ................. G01L 3/104 |
| | | 73/862.325 |
| 2014/0241860 A1 | 8/2014 | Burghardt |
| 2015/0211380 A1 | 7/2015 | Curlier et al. |
| 2016/0178464 A1 | 6/2016 | Burns et al. |
| 2016/0376912 A1 | 12/2016 | Prentice |

FOREIGN PATENT DOCUMENTS

| | | |
|---|---|---|
| EP | 2998720 A2 | 3/2016 |
| EP | 3109409 A1 | 12/2016 |
| FR | 3017657 A1 | 8/2015 |
| JP | 2007-279003 A | 10/2007 |
| WO | WO2014/037673 A1 | 3/2014 |
| WO | WO2018/138291 A1 | 8/2018 |

\* cited by examiner

MAGNETIC TORQUE METERING SYSTEM

GOVERNMENT SPONSORED RESEARCH

The project leading to this application has received funding from the Clean Sky 2 Joint Undertaking under the European Union's Horizon 2020 research and innovation program under grant agreement No. CS2-ENG-GAM-2014-2015-01.

FIELD

The present subject matter is generally related to turbine engines. More specifically, the subject matter is related to fan or propeller gearbox assemblies of turbine engines.

BACKGROUND

Turbine engines are continually challenged to increase efficiencies related performance, fuel consumption, and noise output while generally maintaining or decreasing turbine engine packaging (e.g. axial or radial dimensions). Pursuant to meeting these challenges, turbine engines are incorporating different materials to reduce weight or size while providing similar or increased structural performance.

Turbine engines may include a torque sensor to measure torque from a shaft of the engine. Torque sensor generally measure torque from a shaft of a specific type of material, thereby limiting the type of materials that may be used for a shaft. Consequently, turbine engines are at least partially limited by torque measurement requirements in regard to incorporating different materials to reduce weight or size of turbine engine shafts.

Therefore, a need exists for a turbine engine that may overcome limitations of material types for turbine engine shafts due to torque measurement requirements.

BRIEF DESCRIPTION

Aspects and advantages of the invention will be set forth in part in the following description, or may be obvious from the description, or may be learned through practice of the invention.

The present disclosure is directed to a shaft assembly for a turbine engine, the shaft assembly defining an axial direction and a radial direction. The turbine engine includes a fan or propeller assembly and an engine core. The fan or propeller assembly includes a gearbox. The shaft assembly includes a coupling shaft defining a plurality of coupling shaft teeth extended in the axial direction. Each coupling shaft tooth is in circumferential arrangement along the coupling shaft. The coupling shaft includes a first material and the plurality of coupling shaft teeth include a second material different from the first material.

In one example, the coupling shaft further defines a first end and a second end along the axial direction. The first end is proximate to the engine core and the second end is proximate to the gearbox. The coupling shaft is connected to the engine core at the first end and to the gearbox at the second end. In another example, the plurality of coupling shaft teeth extend in the axial direction from the second end of the coupling shaft.

In various examples, the second material is a permanent magnet material. In one embodiment, the second material defines a magnetic flux greater than the first material.

In another example, the plurality of coupling shaft teeth each define a cavity and an outlet. In one example, the plurality of coupling shaft teeth each include an insert disposed within the cavity. The insert comprises the second material in the plurality of coupling shaft teeth.

In various examples, the shaft assembly may further include a reference shaft disposed inward of the coupling shaft in the radial direction, wherein the reference shaft extends in the axial direction along the coupling shaft. The reference shaft defines a plurality of reference shaft teeth extended in the axial direction and proximate to the plurality of coupling shaft teeth. Each reference shaft tooth is in alternating circumferential arrangement relative to the plurality of coupling shaft teeth. The plurality of reference shaft teeth each comprise the second material different from the first material.

In one example, the plurality of reference shaft teeth each further define a cavity and an outlet. In another example, the plurality of reference shaft teeth each comprise an insert disposed within the cavity. The insert comprises the second material in the plurality of reference shaft teeth. In yet another example, the plurality of reference shaft teeth are disposed to approximately the same circumference as the plurality of coupling shaft teeth. In still another example, the shaft assembly further includes one or more spacers disposed in the radial direction between the coupling shaft and the reference shaft.

In various examples, the shaft assembly further includes a torque sensor disposed toward the plurality of coupling shaft teeth in the radial direction. In one example, the second material defines a magnetic flux density greater than the first material at an angle approximately perpendicular to the torque sensor. In another example, the one or more torque sensors extend toward the plurality of coupling shaft teeth at an angle approximately perpendicular to the plurality of coupling shaft teeth.

Another aspect of the present disclosure is directed to a turbine engine defining an axial direction and a radial direction. The turbine engine includes a fan or propeller assembly including a gearbox and a torque sensor disposed generally in the radial direction. The turbine engine further includes an engine core and a shaft assembly coupled at a first end to the engine core and at a second end to the gearbox of the fan or propeller assembly. The torque sensor is disposed proximate to the shaft assembly. The shaft assembly includes a coupling shaft defining a plurality of coupling shaft teeth extended in the axial direction, wherein each coupling shaft tooth is in circumferential arrangement along the coupling shaft, and further wherein the coupling shaft comprises a first material, and wherein the plurality of coupling shaft teeth further comprise a second material. The shaft assembly further includes a reference shaft disposed inward of the coupling shaft in the radial direction, wherein the reference shaft extends in the axial direction along the coupling shaft, and wherein the reference shaft defines a plurality of reference shaft teeth extended in the axial direction and proximate to the plurality of coupling shaft teeth, and wherein each reference shaft tooth is in alternating circumferential arrangement relative to the plurality of coupling shaft teeth.

In various examples of the turbine engine, the plurality of coupling shaft teeth and/or the plurality of reference shaft teeth each define a cavity and an outlet. In one example, the plurality of coupling shaft teeth and the plurality of reference shaft teeth each comprise an insert disposed within the cavity, and wherein the insert comprises the second material in each of the plurality of coupling shaft teeth and the plurality of reference shaft teeth.

In one example of the turbine engine, the second material defines a magnetic flux density greater than the first material at an angle approximately perpendicular to the torque sensor.

In another example of the turbine engine, the one or more torque sensors extend toward the plurality of coupling shaft teeth at an angle approximately perpendicular to the plurality of coupling shaft teeth.

These and other features, aspects and advantages of the present invention will become better understood with reference to the following description and appended claims. The accompanying drawings, which are incorporated in and constitute a part of this specification, illustrate examples of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
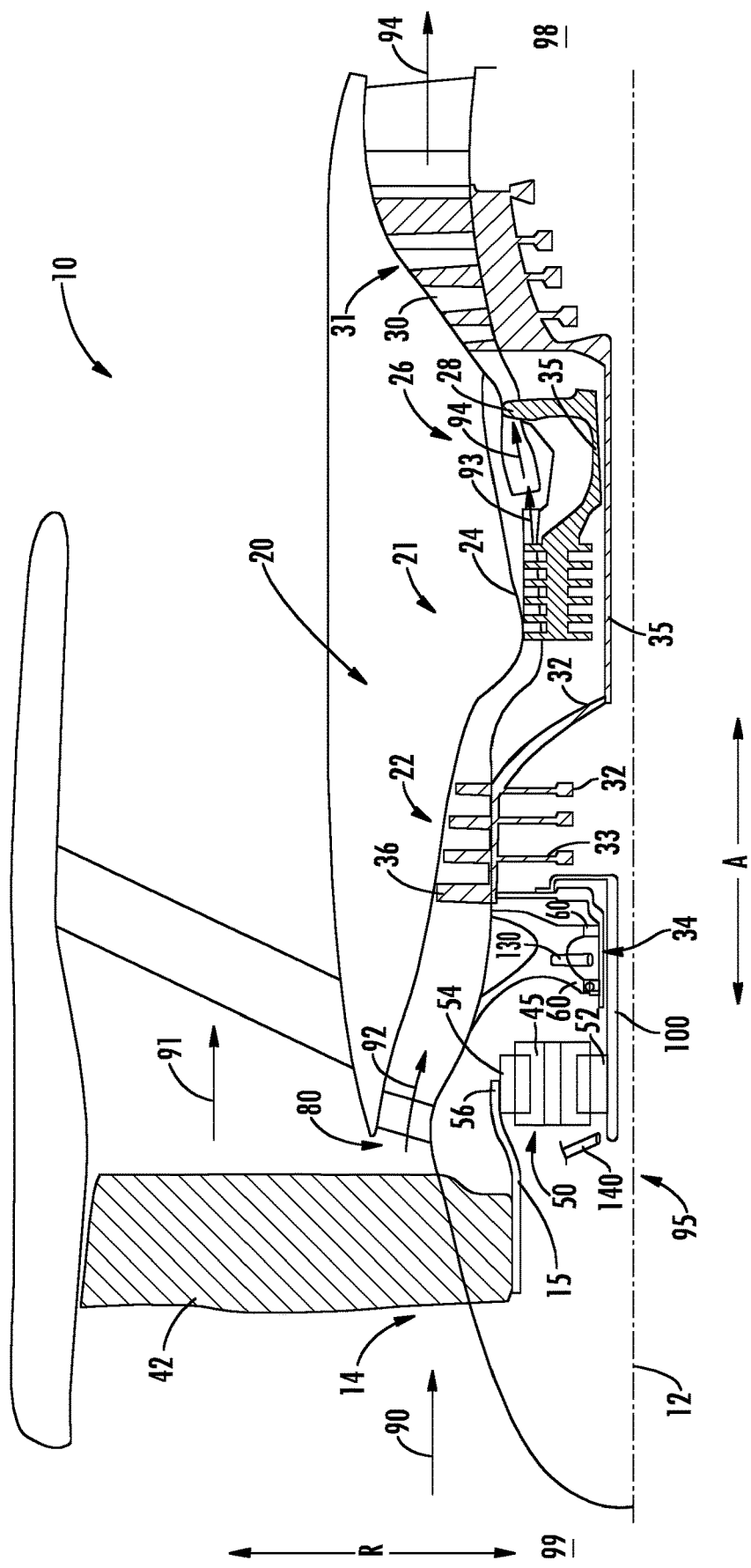
FIG. 1 is a schematic cross sectional view of an exemplary embodiment of a turbine engine arrangement according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Turbine engine arrangements that may overcome limitations of material types for turbine engine shaft due to torque measurement requirements are generally provided.

The turbine engine generally includes a fan or propeller assembly, including a gearbox, and an engine core. The gearbox and the engine core are connected by way of a coupling shaft defining a plurality of coupling shaft teeth extended in the axial direction. In various embodiments, the coupling shaft includes a first material and a second material different from the first material, in which the plurality of coupling shaft teeth includes the second material. In still various embodiments, the turbine engine includes a reference shaft defining a plurality of reference shaft teeth including the second material. Each shaft defines a cavity into which the second material is disposed in the plurality of coupling shaft teeth and reference shaft teeth.

The embodiments of the present disclosure shown and described herein may remove limitations to shaft materials based at least on a torque measurement system. For example, the first material of the shaft may define a structurally appropriate first material including a lower or weaker magnetic flux or magnetic flux density relative to the second material that may be generally poorly suitable for an inductive torque sensor.

Additionally, the second material of the shaft may define a higher magnetic flux or magnetic flux density that may be more appropriate for the inductive torque sensor while removing limitations due to structural performance requirements. Therefore, each shaft may define the first material with little or no regard for magnetic properties. For example, shaft materials may include non-ferromagnetic materials.

Figure 2:
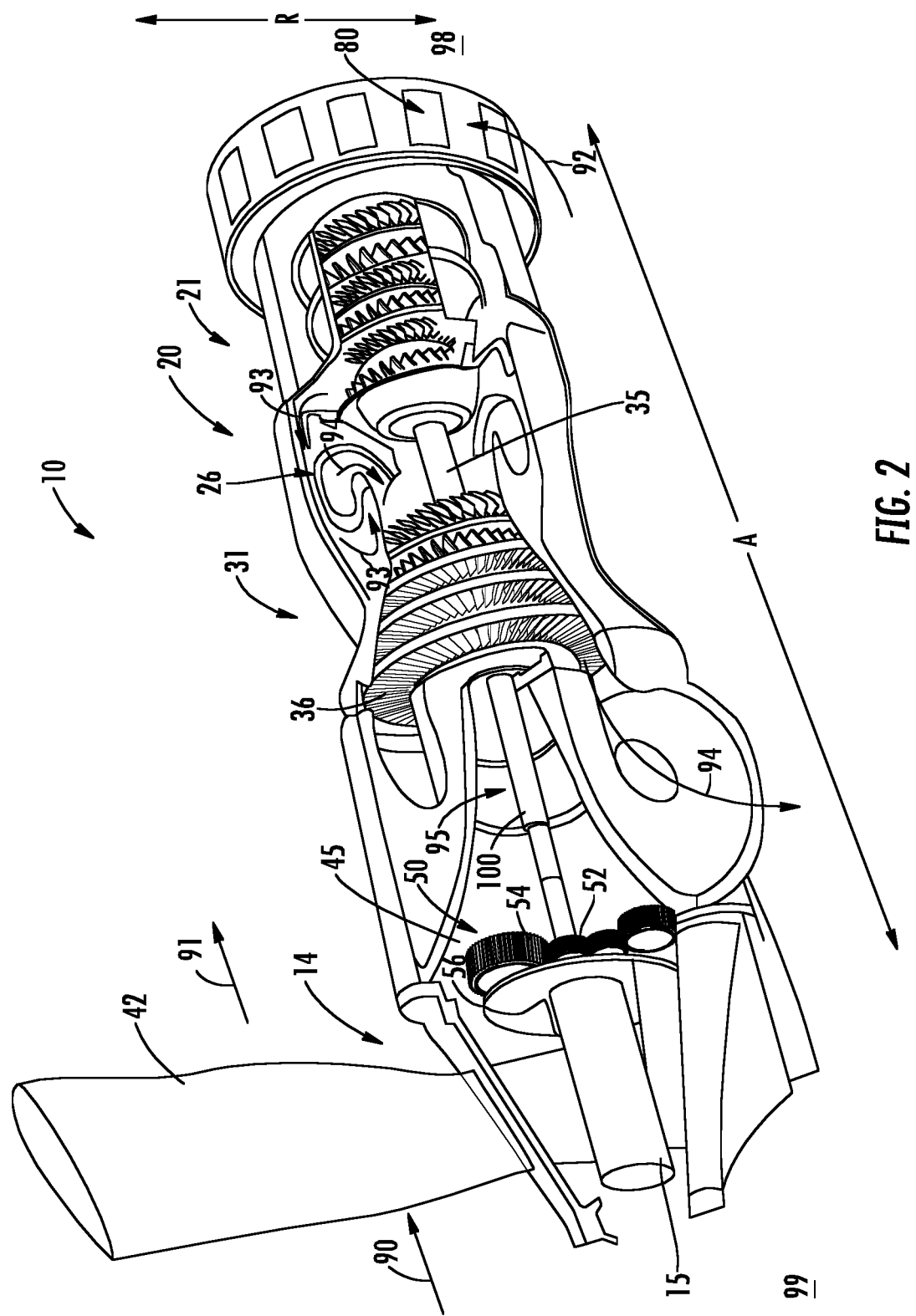
FIG. 2 is a schematic cross sectional view of another exemplary embodiment of a turbine engine arrangement according to an aspect of the present disclosure.

Referring now to the drawings, FIGS. 1 and 2 are each schematic cross sectional views of an exemplary turbine engine 10 (herein referred to as "engine 10") according to an aspect of the present disclosure. In FIG. 1, the engine 10 is shown as a high bypass turbofan engine, incorporating an aspect of the present disclosure. In FIG. 2, the engine 10 is shown as a turboprop engine incorporating an aspect of the present disclosure.

Although further described below with reference to a turbofan engine and/or a turboprop engine, the present disclosure is also applicable to wind turbines and turbomachinery in general, including propfan, turbojet, and turboshaft turbine engines, including marine and industrial turbine engines and auxiliary power units. As shown in FIGS. 1 and 2, the engine 10 has an axial centerline axis 12 that extends there through for reference purposes. The engine 10 defines an axial direction A, a radial direction R, and a forward end 99 and an aft end 98 along the axial direction A.

In general, the engine 10 may include an engine core 20 and a fan or propeller assembly 14. The engine core 20 may generally include, in serial flow arrangement, a compressor section 21, a combustion section 26, and a turbine section 31. The compressor section 21 may define one or more compressors, such as a high pressure compressor (HPC) 24 and a low pressure compressor (LPC) 22. The turbine section 31 may define one or more turbines, such as a high pressure turbine (HPT) 28 and a low pressure turbine (LPT) 30. In various embodiments, the compressor section 21 may further include an intermediate pressure compressor (IPC). In still other embodiments, the turbine section 31 may further include an intermediate pressure turbine (IPT).

Each of the compressors 22, 24 in the compressor section 21 and the turbines 28, 30 in the turbine section 31 may include one or more rotors 32. In one embodiment, the rotors 32 include one or more shafts 35 of the engine 10 connecting the compressor section 21 to the turbine section 31. In other embodiments, the rotors 32 generally define a disk 33 extended at least partially in the radial direction R and a plurality of airfoils connected in circumferentially adjacent arrangement and extended outward in the radial direction R from the disk 33. The one or more rotors 32 may each be connected together. For example, each rotor 32 of the turbine section 31 or the compressor section 21 may be connected by mechanical fasteners, such as bolts, nuts, or rivets, or by a bonding process, such as welding, friction bonding, diffusion bonding, etc. In various embodiments, one or more compressors of the compressor section 21 may be drivingly connected and rotatable with one or more turbines of the turbine section 31 by way of one or more drive shafts 35.

The fan or propeller assembly 14 generally includes a fan rotor 15. The fan rotor 15 includes a plurality of fan or propeller blades 42 that are coupled to and extend outwardly from the fan rotor 15 in the radial direction R. The fan rotor 15 may extend in the axial direction A toward the forward end 99 from a reduction or power gearbox 45. The fan or propeller assembly 14 further includes a shaft assembly 95 including a coupling shaft 100 coupled to the gearbox 45 and extended toward the aft end 98 and coupled to the engine core 20.

In one embodiment, the gearbox 45 may include a gear train 50 including a star gear 52 and a plurality of planet gears 54. The plurality of planet gears 54 may each be fixed such that each planet gear 54 rotates on a fixed axis relative to the star gear 52. An annular gear 56 surrounds the plurality of planet gears 54 and rotates and transfers power and torque from the star gear 52 through the plurality of planet gears 54. In one embodiment, the star gear 52 may be attached to, unitary, or integral to the coupling shaft 100. In various embodiments, the gearbox 45 may further include additional planet gears disposed radially between the plurality of planet gears 54 and the star gear 52, or between the plurality of planet gears 54 and the annular gear 56.

Referring back to FIGS. 1 and 2, the coupling shaft 100 may define a generally hollow annular surface extended along the axial direction A. The coupling shaft 100 may be connected to the engine core 20 to transmit torque and power to the star gear 52. The fan rotor 15 may be connected to the surrounding annular gear 56 or the planet gears 54 to receive torque from the star gear 52 and transfer torque to drive the fan or propeller assembly 14. As power and torque are transmitted from the engine core 20, the gearbox 45 provides power and torque at an output speed to the fan rotor 15 more suitably adjusted for the fan or propeller assembly 14.

Figure 3:
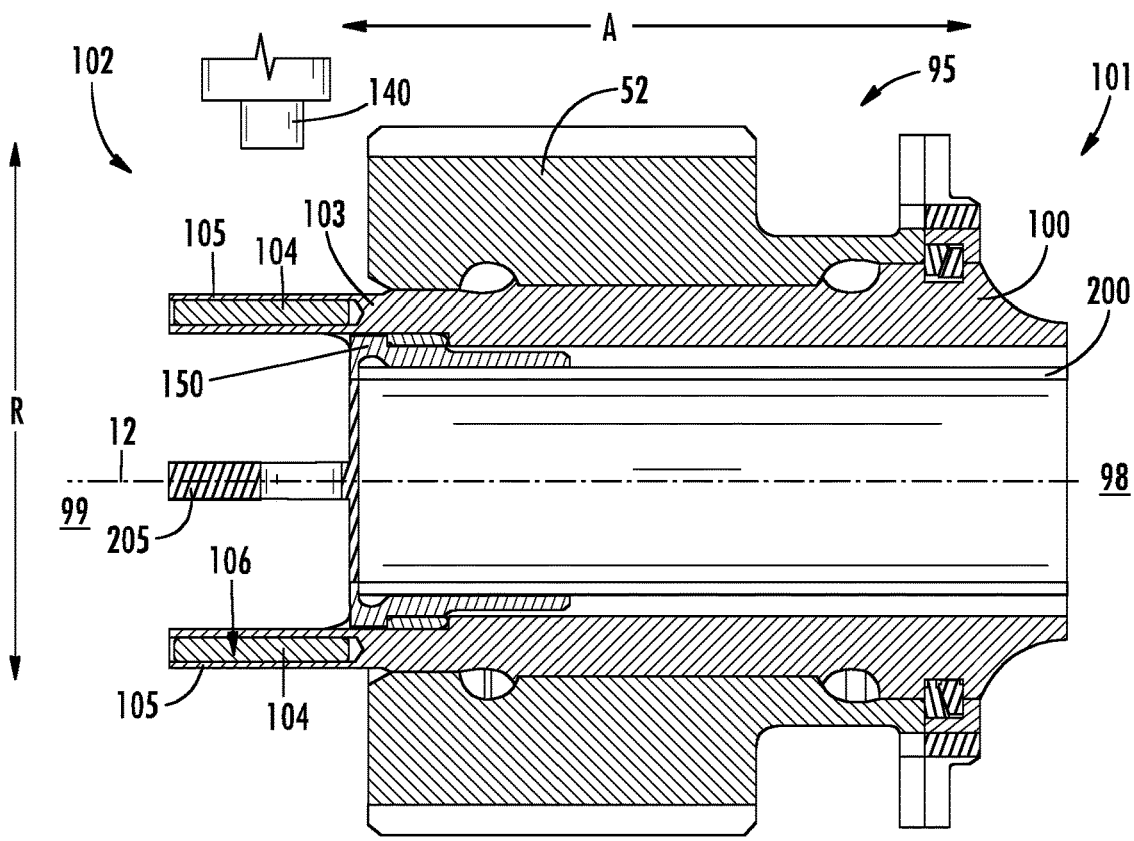
FIG. 3 is a schematic cross sectional view of an exemplary embodiment of a coupling shaft connecting an exemplary gearbox and engine core.
Figure 4:
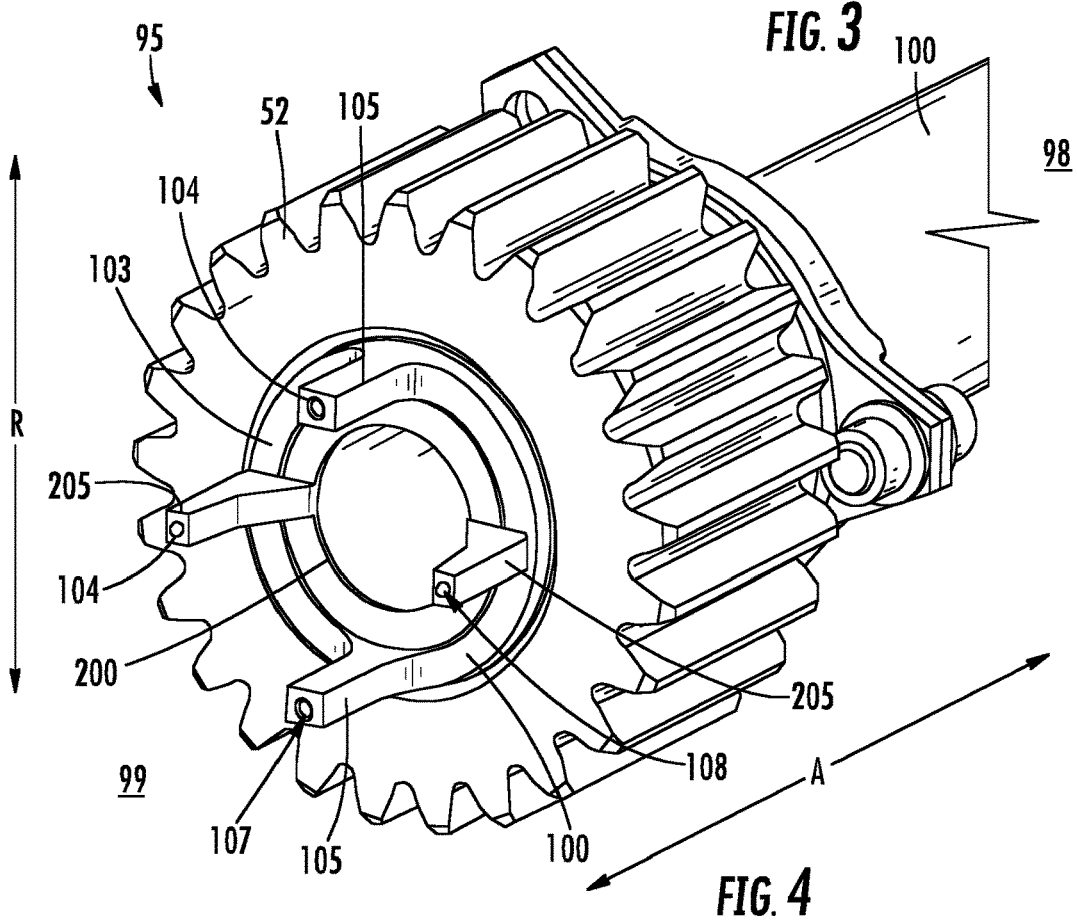
FIG. 4 is a perspective view of another exemplary embodiment of a coupling shaft connecting an exemplary gearbox and engine core.

Referring now to FIGS. 3 and 4, exemplary embodiments of a portion of the engine 10 including the shaft assembly 95 are provided. FIG. 3 provides a cross sectional side view of the engine 10 including an exemplary embodiment of the shaft assembly 95. FIG. 4 provides a perspective view of the engine 10 including another exemplary embodiment of the shaft assembly 95. The coupling shaft 100 defines a plurality of coupling shaft teeth 105 extended in the axial direction A. Each coupling shaft tooth 105 is in circumferential arrangement along the coupling shaft 100. The coupling shaft 100 further includes a first material 103 and the plurality of coupling shaft teeth 105 each include a second material 104 different from the first material 103.

The coupling shaft 100 may further define a first end 101 and a second end 102 along the axial direction A. In one embodiment, the first end 101 is proximate to the engine core 20 and the second end 102 is proximate to the gearbox 45. In various embodiments, the coupling shaft 100 is connected at the first end 101 to the engine core 20 and at the second end to the gearbox 45. In the embodiment shown in FIG. 3, the plurality of coupling shaft teeth 105 extend in the axial direction A from the second end 102 of the coupling shaft 100.

Referring still to FIGS. 3 and 4, in various embodiments, the engine 10 and shaft assembly 95 further include a reference shaft 200 disposed inward of the coupling shaft 100 in the radial direction R. The reference shaft 200 extends in the axial direction A along the coupling shaft 100. The reference shaft 200 defines a plurality of reference shaft teeth 205 extended in the axial direction A and proximate to the plurality of coupling shaft teeth 105. Each reference shaft tooth 205 is in alternating circumferential arrangement relative to the plurality of coupling shaft teeth 105. In one embodiment, the plurality of reference shaft teeth 205 are disposed to approximately the same circumference as the plurality of coupling shaft teeth 105 relative to the axial centerline 12. In various embodiments, the plurality of reference shaft teeth 205 may extend at least partially in the axial direction A and at least partially in the radial direction R to define an approximately circumferentially adjacent arrangement relative to the plurality of coupling shaft teeth 105. In still other embodiments, the reference shaft 200 may include the first material 103. Alternatively, in yet other embodiments, the reference shaft 200 may include a material other than the first or second material 103, 104, in which the other material defines a lower or weaker magnetic flux or magnetic flux density relative to the second material 104.

As shown in FIGS. 3 and 4, the engine 10 and shaft assembly 95 may further include one or more spacers 150 disposed between the coupling shaft 100 and the reference shaft 200 along the radial direction R. The combination of the coupling shaft 100, the one or more spacers 150, and the reference shaft 200 may define a press fit or an interference fit arrangement such that the reference shaft 200 is positioned and/or retained relative to the spacer(s) 150 and the coupling shaft 100 by way of force exerted in the radial direction onto the coupling shaft 100. For example, thermal differences may be used to assemble and retain the coupling shaft 100, the spacer(s) 150, and/or the reference shaft 200, such as applying heat to the coupling shaft 100 and/or the spacer 150, or such as removing heat from (i.e. cooling) the spacer(s) 150 and/or the reference shaft 200.

Referring now to FIG. 3, in various embodiments the engine 10 further includes one or more torque sensors 140 disposed toward the plurality of coupling shaft teeth 105 and/or reference shaft teeth 205 along the radial direction R. In one embodiment, the torque sensor 140 defines a rotary torque sensor configured to measure twist angle or phase shift of the coupling shaft 100 relative to the reference shaft 200. In various embodiments, the one or more torque sensors 140 extend toward the plurality of teeth 105, 205 at an angle approximately perpendicular to the plurality of teeth 105, 205. In various embodiments including a plurality of torque sensors 140, the plurality of torque sensors 140 are in approximately equal circumferential spacing relative to the axial centerline 12. In one embodiment, the engine 10 includes two torque sensors 140 spaced approximately 180 degrees apart relative to the axial centerline 12. In other embodiments, the plurality of torque sensors 140 may be placed in unequal circumferential arrangement relative to the axial centerline 12.

Referring back to FIGS. 3 and 4, in various embodiments, the second material 104 is a permanent magnet material defining magnetic properties stronger than the first material 103. In one embodiment, the second material 104 defines a ferromagnetic material. In other embodiments, the second material 104 defines a magnetic flux greater than the first material 103. In still other embodiments, the second material 104 defines a magnetic flux density greater than the first material 103. In one embodiment, the second material 104 defines a magnetic flux density greater than the first material 103 at an angle approximately perpendicular to the one or more torque sensors 140. In another embodiment, the second material 104 defines a magnetic flux density greater than the first material at an angle approximately parallel to the one or more torque sensors 140 along the radial direction R. In various embodiments, the second material 104 may be defined based at least on the torque sensor(s) 140 and/or a desired spacing in the radial direction R of the torque sensor(s) 140 relative to the plurality of teeth 105, 205. For example, the second material 104 may define a greater magnetic flux or magnetic flux density such that the one or more torque sensors 140 may be placed more outward in the radial direction R from the plurality of teeth 105, 205.

Referring to FIGS. 3 and 4, in one embodiment, the plurality of coupling shaft teeth 105 and/or the plurality of reference shaft teeth 205 each define a cavity 106 into which the second material 104 is disposed. The second material 104 may be formed integral within the first material 103 of the coupling shaft 100 or the reference shaft 200. For example, the coupling shaft 100 and/or the reference shaft 200 may be formed by way of additive manufacturing, in which the second material 104 is placed in the cavity 106 and the first material 103 is formed around the second material 104.

In other embodiments, such as shown in FIG. 4, the engine 10 may include a plurality of inserts 108 comprising the second material 104. The plurality of coupling shaft teeth 105 and/or the plurality of reference shaft teeth 205 may further define an outlet 107 at each cavity 106 disposed toward the second end 102. The plurality of inserts 108 may be disposed within each of the coupling shaft teeth 105 and/or each of the reference shaft teeth 205. In one embodiment, the insert 108 may be disposed within the cavity 106 of each tooth 105, 205. In various embodiments, the inserts 108 may be placed or removed from each cavity 106 through each outlet 107.

The shaft assembly 95, including the coupling shaft 100, the reference shaft 200, and/or the spacers 150, in addition to other parts, components, or assemblies of the engine 10 shown and described in regard to FIGS. 1-4 may be formed of metals or composites appropriate for turbine engines including, but not limited to, iron-based, titanium-based, nickel-based, or cobalt-based alloys, each of which may include chromium, cobalt, tungsten, tantalum, molybdenum, and/or rhenium. The coupling shaft 100 may be formed using casting, forging, machining, or combinations thereof. Additionally, or alternatively, the coupling shaft 100 may be formed as a single unitary structure or an assembly of several components joined by one or more mechanical fasteners or joining processes, or combinations thereof.

During operation of the engine 10, as shown and described in regard to FIGS. 1-4 collectively, a volume of air as indicated schematically by arrows 90 enters the engine 10. As the air 90 passes across the fan or propeller blades 42, a portion of the air as indicated schematically by arrows 91 is directed or routed outside of the engine core 20 to provide propulsion. Additionally, another portion of air as indicated schematically by arrows 92 is directed or routed through an associated inlet 80 into the compressor section 21. The air 92 is progressively compressed as it flows through the compressor section 21, such as through the LPC 22 and the HPC 24, toward the combustion section 26.

The now compressed air as indicated schematically by arrows 93 flows into the combustion section 26 where a fuel is introduced, mixed with at least a portion of the compressed air 93, and ignited to form combustion gases 94. The combustion gases 94 flow into the turbine section 31, causing rotary members of the turbine section 31 to rotate and support operation of respectively coupled rotary members in the compressor section 21 and/or fan or propeller assembly 14. For example, the HPC 24 and the HPT 28 may be coupled and rotatable to drive the engine 10 and generate combustion gases 94 at the combustion section 26 to drive the LPT 30. The LPT 30 may be connected to the LPC 22. Referring to FIG. 1, the coupling shaft 100 may be attached to the LPC 22 at the first end 101 and to the gearbox 45 at the second end 102. In other embodiments the flexible coupling 100 shaft may be attached to the HPC 24 at the first end 101.

Referring to FIG. 2, the coupling shaft 100 may be attached to the LPT 30 at the first end 101 and to the gearbox 45 at the second end 102. In other embodiments the coupling shaft 100 may be attached to the HPT 28 at the first end 101. The gearbox 45 may reduce the rotational speed from the engine core 20 (e.g. the compressor section 21 or the turbine section 31) and provide a desired amount of torque and rotational speed to the fan or propeller assembly 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A shaft assembly for a turbine engine, the shaft assembly defining an axial direction and a radial direction, wherein the turbine engine includes a fan or propeller assembly and an engine core, and further wherein the fan or propeller assembly includes a gearbox, the shaft assembly comprising:
   a coupling shaft defining a plurality of coupling shaft teeth extended in the axial direction, wherein each coupling shaft tooth is in circumferential arrangement along the coupling shaft, and further wherein the coupling shaft comprises a first material, and wherein the plurality of coupling shaft teeth comprise a second material different from the first material,
   wherein the plurality of coupling shaft teeth each define a cavity and an outlet.

2. The shaft assembly of claim 1, wherein the coupling shaft further defines a first end and a second end along the axial direction, and wherein the first end is proximate to the engine core and the second end is proximate to the gearbox, and wherein the coupling shaft is connected to the engine core at the first end and to the gearbox at the second end.

3. The shaft assembly of claim 2, wherein the plurality of coupling shaft teeth extend in the axial direction from the second end of the coupling shaft.

4. The shaft assembly of claim 1, wherein the second material is a permanent magnet material.

5. The shaft assembly of claim 4, wherein the second material defines a magnetic flux greater than the first material.

6. The shaft assembly of claim 1, wherein the plurality of coupling shaft teeth each comprise an insert disposed within the cavity, and wherein the insert comprises the second material in the plurality of coupling shaft teeth.

7. The shaft assembly of claim 1, further comprising:
a reference shaft disposed inward of the coupling shaft in the radial direction, wherein the reference shaft extends in the axial direction along the coupling shaft, and wherein the reference shaft defines a plurality of reference shaft teeth extended in the axial direction and proximate to the plurality of coupling shaft teeth, and wherein each reference shaft tooth is in alternating circumferential arrangement relative to the plurality of coupling shaft teeth, and wherein the plurality of reference shaft teeth each comprise the second material different from the first material.

8. The shaft assembly of claim 7, wherein the plurality of reference shaft teeth each define a cavity and an outlet.

9. The shaft assembly of claim 8, wherein the plurality of reference shaft teeth each comprise an insert disposed within the cavity, and wherein the insert comprises the second material in the plurality of reference shaft teeth.

10. The shaft assembly of claim 7, wherein the plurality of reference shaft teeth are disposed to approximately the same circumference about an axial centerline of the turbine engine as the plurality of coupling shaft teeth.

11. The shaft assembly of claim 7, further comprising:
one or more spacers disposed in the radial direction between the coupling shaft and the reference shaft.

12. The shaft assembly of claim 1, further comprising:
one or more torque sensors disposed toward the plurality of coupling shaft teeth in the radial direction.

13. The shaft assembly of claim 12, wherein the second material and the first material are spaced circumferentially around an axial centerline of the turbine engine, and wherein the second material defines a magnetic flux density greater than the first material at an angle approximately perpendicular to the one or more torque sensors.

14. The shaft assembly of claim 12, wherein the coupling shaft teeth are located circumferentially spaced around an axial centerline of the turbine engine, and wherein the one or more torque sensors extend toward the plurality of coupling shaft teeth at an angle approximately perpendicular to the plurality of coupling shaft teeth.

* * * * *